W. H. BOYES.
VEHICLE TIRE.
APPLICATION FILED NOV. 21, 1911.

1,141,908.

Patented June 1, 1915.

WITNESSES
Geo. R. Lines
John C. Kopf

INVENTOR
Wm. H. Boyes
BY
his ATTORNEY

UNITED STATES PATENT OFFICE.

WILLIAM H. BOYES, OF BROOKLYN, NEW YORK.

VEHICLE-TIRE.

1,141,908.   Specification of Letters Patent.   Patented June 1, 1915.

Application filed November 21, 1911. Serial No. 661,510.

*To all whom it may concern:*

Be it known that I, WILLIAM H. BOYES, a citizen of the United States, residing at Brooklyn, in the county of Kings and State of New York, have invented a new and useful Improvement in Vehicle-Tires, of which the following is a specification.

This invention relates to a vehicle tire, particularly for automobiles and motor trucks, where it is important that an efficient cushion be provided against the jars of an uneven pavement, but where the shocks and strains of use are very destructive.

One object of the present invention is to provide a vehicle tire which affords substantially as effective a cushion, as a tire of the ordinary sort having an inner tube and an outer shoe of substantially circular section.

Another object of the present invention is to provide a tire in which the tread or running part has a high degree of toughness or wear resisting quality and durability, so that the same has a long life even in severe conditions of use.

A further object of the invention is to provide a tire having its tread or wearing part renewable at small expense, so that the life of the complete tire may be greatly prolonged by renewing its worn portion and retaining the more expensive features which go to furnish the cushion.

A further object of the invention is to provide a tire which avoids the use of any fastening devices such as rivets, screws or the like, working in any rubber or similar soft material, as such elements produce rapid wear in the soft material where they are contained.

A still further object of the invention is to provide a tire which is held in place by pressure, which is not liable to be rim-cut by the tread material working against any hard edge, and in which the tread portion is so organized as to be particularly resistant against the action of sharp stones and the like which are encountered in ordinary use.

With these objects in view the invention consists in the improved tire as hereinafter set forth and claimed.

Figure 1:
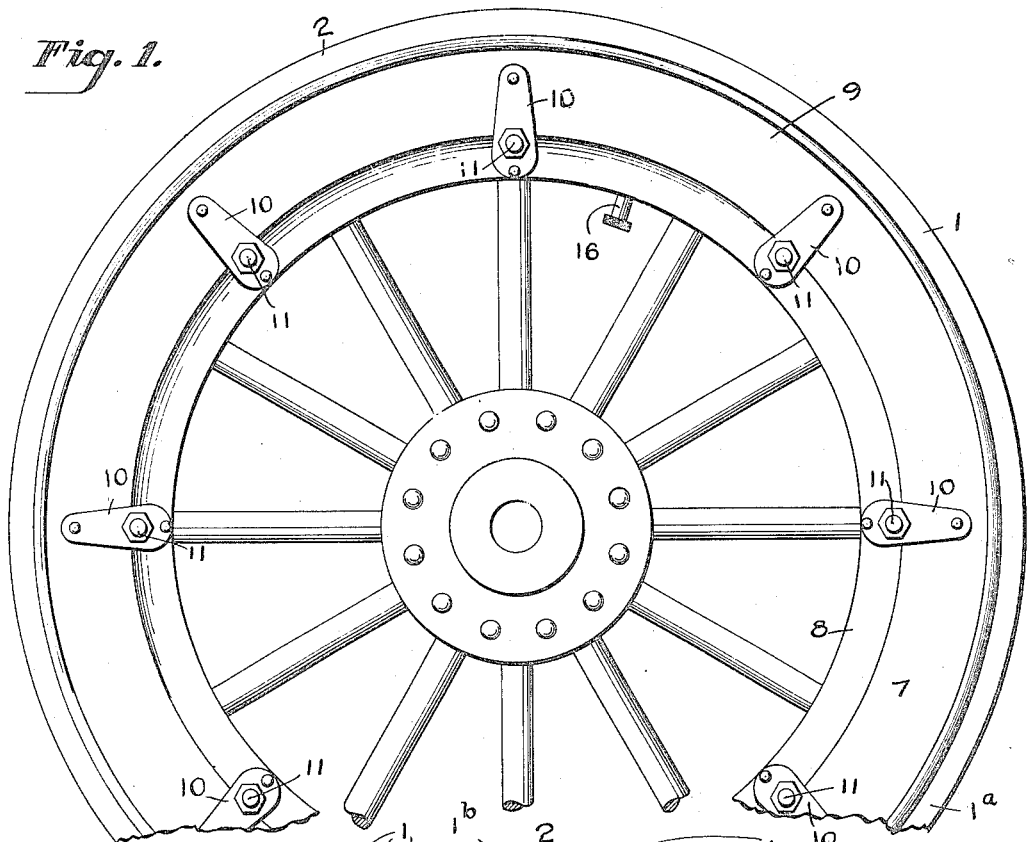
Figure 2:
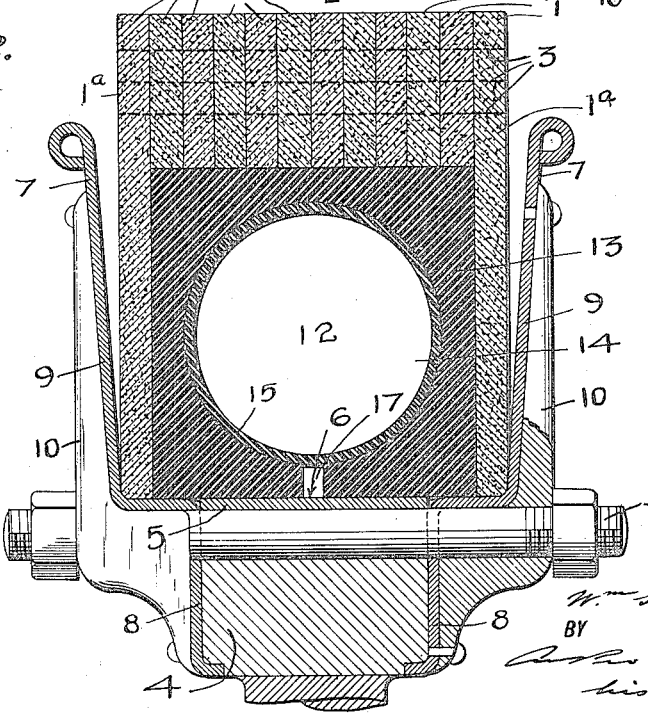

In the drawings, Figure 1, is a side elevation of a vehicle tire embodying the principles of this invention, and Fig. 2, is a transverse section of the same.

Constructions embodying the invention will include a plurality of flat rings 1 of flexible sheet material, in other words, flat flexible rings organized together into a unitary ring or structure 2 of substantial width by suitable securing means. The best constructions embodying the invention will include flat washer or disk shaped leather rings 1, or rolled cloth and rubber fabric of the sort used in packing gaskets, or these materials alternated. These flat disk shaped leather or canvas and rubber rings, have a peculiar strength edgewise when assembled in a group. This is due to several causes which it is perhaps unnecessary to explain. It will be evident, however, that the forcible impact of any pointed object against the periphery of such a structure is resisted by a large number of the rings acting in unison, but each ring, while resisting with the full strength of its material considered edgewise, and which strength of resistance is very great, will not continue to oppose its resistance after a certain predetermined point or limit, but will yield inwardly and thereby escape destruction or injury. And finally, each ring may receive considerable injury by extreme occasions occurring in lapse of time and by continued use, without in any way impairing the resisting power or general efficiency of the aggregate mass. The rings are secured together by a series of lines of stitches 3 running clear through the mass from one side to the other; cement or vulcanization may of course be used in any form.

The best constructions will include a group of assembled flat rings as above described, the end rings $1^a$ being considerably deeper than the intermediate rings $1^b$. 4 denotes the felly of the wheel and 5 a metallic facing with a cylindrical surface 6. The construction of the wheel with its felly presents no special features except as hereafter indicated. I provide deep removable metal flanges 7 on both sides of the felly 4, preferably made of pressed steel, and having a bracket shaped transverse section with an interior face 8 fitting against the side of the felly and an exterior part 9 constituting the flange proper which projects to a considerable distance beyond the felly so as to serve certain purposes presently pointed out. This flange will extend radially outward for a distance greater than the interior diameter of the flexible ring $1^b$, but less than the outside diameter of these rings.

10 denotes ribs separate from the flanges 7 and preferably made of forged steel. These ribs 10 are apertured to receive bolts 11 which pass entirely through the ribs, the flanges and the felly thus securing the whole structure together. The ribs will also be riveted to the flanges, and evidently strengthen the latter against yielding, particularly outward.

The structure thus far described provides a completely armored annular cavity 12 outside the felly 4 and between the flanges 7 and inside the flexible flat rings 1ᵇ. Within this annular cavity I provide a resilient member or cushion 13, and in the most practical embodiments I make use of a rubber cushion with a cavity 14 of circular section as illustrated. In the latter case there will be an interior inner tube 15 with the usual inlet valve 16 extending through the felly, and the cushion 13 will be divided on the line 17 so as to permit the removal of the inner tube, by suitably springing the surrounding rubber mass or cushion 13 apart when the latter is off the wheel. The interior of the cushion 13 is left smooth and the inner tube 15 has the usual smooth surface common to inner tubes as now manufactured.

In operation the flat flexible rings yield by bending out of their circular form extending around the wheel instead of bending laterally in the manner for example that the rubber of an ordinary pneumatic tire bends when passing an obstruction. In this yielding the individual rings have considerable strength, as mentioned in the early part of the specification, and they all assist one another so that the strength of all is made use of together. But their resisting never amounts to a point where they will be seriously injured, since they can yield inwardly as just described, or can flex slightly at local points in any direction, thus escaping injury from forces which might otherwise disrupt the material. When passing obstructions which have a tendency to tear or abrade the side of any ordinary tire, the flanges 7 come into action, and being of steel constitute a practically impregnable armor against any injury or abrasion whatever at the sides. These flanges extend out far enough radially to completely incase the sides of the tire at points where there is any possibility of puncture or serious injury. In other words the region over the interior cavity 12 is completely armored or incased. But these flanges do not extend out far enough to engage the road bed and suffer injury or cause objectionable jars, since the depth of all the flat flexible rings is sufficiently great to permit the maximum yielding required to take place without the outside of these rings entering beyond the rims of the flanges. The effect of air pressure is necessarily to distend the flat rings 1ᵃ into strong pressing engagement with the flanges 7. But the pressure is divided or balanced on both sides equally, with the result that the rubber part of the tire is kept forcibly centered between the two flanges 7. It results that the outer portion near the tread is kept out of contact with the rims of the metal flanges 7, because this outer part or tread portion is inexpansible widthwise, and narrower than the separation of the rims of the flanges 7. If however the tire becomes deflated so that there is no backing for the rings, the wheel will run on the flanges 7 without injury, the speed of course being restricted under these circumstances. In running up against a curb the same principles apply and the usual curb bruises are avoided. When the vehicle is being driven at high speeds and is turning a corner, the flanges come into action to prevent the tire from being swept laterally off the wheel, the solid resistance of the bolts 11 and metal flanges 7 being more than adequate for any strains which can be put on the wheel in this way. Also the loosening of the tire by centrifugal force and the accompanying action of high speeds is completely prevented on account of the depth of the flanges. When the tire rolls over upstanding spikes or nails, the latter may penetrate to a certain distance, but the depth of the rings is so great as to prevent the ingress of any nail to a sufficient distance to cause a puncture. In case a blow-out should occur, the tire is still securely held by the flanges and accidents prevented.

I have already referred to the fact that the present tire is substantially proof against loss of air by blow-outs, punctures, porosity or any local structural defects either in the inner tube or in the outer rubber mass or cushion 13. These characteristics follow from the fact that the rubber mass 13 is wholly inclosed in an armored cavity of perfectly definite size and with strongly resistant walls. These walls prevent ingress of any object which might damage the tire from the outside, and in addition the walls serve to so support the tire that it has the advantages just mentioned. Any soft spot in the rubber mass 13 will not be blown out in the form of a protuberance thus stretching and weakening the wall at this point, because in every direction the rubber mass is so incased by a strongly resistant wall, that it is impossible for it to be blown outward at any local point. Furthermore the result of the air pressure inside is to compress rather than to distend the rubber so that any porosity therein will be closed up by the air pressure therein rather than expanded to permit leakage. In the same way any porosity of the inner tube, or puncture therein, is in effect sealed by the rubber mass 13, the compression just mentioned serving to so firmly compress the rubber in every direction that the air will not escape. The smooth interior of the rubber mass 13 is a part of this action. The very fact that the entire interior of this rubber mass or cushion is under a compression strain rather than tensile strain is conducive to long life, since a constant tension on rubber or rubber fabric is one of the principal sources of tire deterioration.

What I claim is: —

A vehicle tire comprising a plurality of flat flexible rings assembled together with their flat faces in contact, a pair of outer rings also flat throughout and of the same material, but extending radially inward to a greater depth, whereby an annular space of rectangular and four cornered section is provided between them, a rubber cushion of rectangular transverse section filling this annular cavity, said rubber cushion having an annular interior cavity of rounded transverse section and an inner tube within this cushion.

In testimony whereof, I have hereunto set my hand, in the presence of two subscribing witnesses.

WILLIAM H. BOYES.

Witnesses:
ALFRED W. PROCTOR,
E. S. SINGER.

Copies of this patent may be obtained for five cents each, by addressing the "Commissioner of Patents, Washington, D. C."